United States Patent
Gluck

(10) Patent No.: US 10,161,457 B2
(45) Date of Patent: Dec. 25, 2018

(54) BEARING ARRANGEMENT AND CORRESPONDING PRODUCTION PROCESS

(71) Applicant: Schaeffler Technologies AG & Co. KG, Herzogenaurach (DE)

(72) Inventor: Stefan Gluck, Schweinfurt (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 63 days.

(21) Appl. No.: 15/307,200

(22) PCT Filed: Mar. 31, 2015

(86) PCT No.: PCT/DE2015/200241
§ 371 (c)(1),
(2) Date: Oct. 27, 2016

(87) PCT Pub. No.: WO2015/180715
PCT Pub. Date: Dec. 3, 2015

(65) Prior Publication Data
US 2017/0045088 A1   Feb. 16, 2017

(30) Foreign Application Priority Data

May 28, 2014 (DE) .................. 10 2014 210 201

(51) Int. Cl.
| | |
|---|---|
| *F16C 41/00* | (2006.01) |
| *F16C 19/06* | (2006.01) |
| *B33Y 10/00* | (2015.01) |
| *B33Y 80/00* | (2015.01) |

(52) U.S. Cl.
CPC ............ *F16C 41/007* (2013.01); *B33Y 10/00* (2014.12); *B33Y 80/00* (2014.12); *F16C 41/00* (2013.01); *F16C 19/06* (2013.01); *F16C 2220/24* (2013.01); *F16C 2226/70* (2013.01)

(58) Field of Classification Search
CPC .... F16C 41/00; F16C 41/007; F16C 2220/24; F16C 2226/70
See application file for complete search history.

(56) References Cited

U.S. PATENT DOCUMENTS

| | | | | |
|---|---|---|---|---|
| 4,259,637 | A * | 3/1981 | Bloomfield | ......... F16C 33/7859 324/166 |
| 6,043,643 | A | 3/2000 | Message et al. | |
| 6,325,961 | B1 | 12/2001 | Beers et al. | |
| 6,592,264 | B2 * | 7/2003 | Yabe | ..................... B60L 327/00 384/484 |

(Continued)

FOREIGN PATENT DOCUMENTS

| | | |
|---|---|---|
| CN | 101614244 | 12/2009 |
| CN | 101836120 | 9/2010 |

(Continued)

OTHER PUBLICATIONS

Translaton of DE602006000341 obtained Feb. 22, 2018.*

*Primary Examiner* — James Pilkington
(74) *Attorney, Agent, or Firm* — Volpe and Koenig, P.C.

(57) ABSTRACT

A bearing arrangement including a rolling or sliding bearing that has an inner ring and an outer ring and at least one add-on part provided on the inner ring or on the outer ring, this add-on part being formed of a meltable or curable material and being attached with a positive fit to the inner ring or the outer ring by a generative manufacturing process.

14 Claims, 3 Drawing Sheets

(56) References Cited

U.S. PATENT DOCUMENTS

| | | | |
|---|---|---|---|
| 6,655,844 B1 | 12/2003 | Message et al. | |
| 8,814,437 B2 | 8/2014 | Braun | |
| 9,175,728 B2 * | 11/2015 | White | F16C 33/7843 |
| 2005/0201648 A1 * | 9/2005 | Takada | F16C 41/007 |
| | | | 384/448 |
| 2010/0296759 A1 | 11/2010 | Dlugai et al. | |
| 2014/0212677 A1 | 7/2014 | Gnüchtel et al. | |

FOREIGN PATENT DOCUMENTS

| | | |
|---|---|---|
| CN | 103702958 | 4/2014 |
| CN | 103786342 | 5/2014 |
| DE | 19740502 | 3/1999 |
| DE | 60014470 | 2/2006 |
| DE | 102005005667 | 8/2006 |
| DE | 602006000341 | 11/2008 |
| DE | 102008028742 | 1/2010 |
| DE | 102009021469 | 11/2010 |
| DE | 102010034962 | 2/2012 |
| DE | 102012016309 | 2/2014 |
| EP | 2639720 | 9/2013 |
| GB | 2508914 | 6/2014 |
| JP | 2001301045 | 10/2001 |
| WO | 2007078321 | 7/2007 |
| WO | 2008064631 | 6/2008 |
| WO | 2010143022 | 12/2010 |
| WO | 2012126689 | 9/2012 |

* cited by examiner

BEARING ARRANGEMENT AND CORRESPONDING PRODUCTION PROCESS

The invention relates to a bearing arrangement comprising a rolling or sliding bearing with an inner ring and an outer ring and at least one attachment part arranged on the inner ring or on the outer ring.

BACKGROUND

Various applications require a bearing with an attachment part. The attachment part can be, e.g., a housing for the mounting of a sensor or for electronic components.

Conventional bearing arrangements of this type, which are also designated as sensor bearings, are usually built so that an attachment part is bonded to the bearing or an injection molded part is clipped in a sealing groove on one of the rings. However, such attachment parts must be produced specifically for a certain bearing type, because the bearing diameters, geometry of the sealing grooves, and other dimensions are different. This produces high tool costs for deep-drawing dies and/or injection molding dies, so that attachment parts can be produced economically only if large quantities are produced. Accordingly, the variety of types of bearings with sensors is very limited.

Therefore, it would be desirable to provide a bearing arrangement that is also economical in small quantities.

SUMMARY

The invention is thus based on the object of providing a bearing arrangement with an attachment part that can also be produced economically in small quantities.

To achieve this object, it is provided according to the invention for a bearing arrangement of the type specified above that the attachment part is made from a meltable or curable material and is attached to the inner ring or the outer ring with a positive fit through a generative production process.

The invention concerns the idea of producing small quantities of an attachment part through a method that is typically used in the scope of rapid prototyping. A simple replacement of injection-molded or deep-drawn attachment parts by attachment parts that have been produced through a rapid prototyping method is very difficult due to the limited tolerances. In particular, the formation of snap-on contours is problematic, so that a conventional rapid prototyping method is not suitable for series production.

The meltable or curable material is preferably a plastic material that can be processed by a generative production method. Examples for such a material that can be used for producing the bearing arrangement according to the invention include a UV-curable plastic, that is, a material that can be cross-linked and cured by irradiation with ultraviolet light. The meltable or curable material can be used, e.g., in a melt deposition method. For this purpose, it is heated above its melting temperature and deposited through a suitable apparatus. As another generative production method, a deposition welding method can also be used in which the deposited material is melted by a laser. The deposited material can be prepared as a wire or filament and deposited by a deposition device onto the inner ring or the outer ring. In principle, the material that can be used in the generative production method could also be a metallic material that forms, e.g., with other components, a paste that can be deposited by a corresponding apparatus onto an inner ring or an outer ring and then cured through irradiation with a radiation tool (laser). To generate certain mechanical or electrical properties of the attachment part, it can also be provided that the meltable or curable material is comprised from a plastic material and a metallic material.

The invention achieves the objective by attaching the attachment part through a generative production method, such as a melt deposition method, with a positive fit onto the inner ring or the outer ring. In this way, the attachment part is connected to the rolling or sliding bearing through a positive-fit connection instead of a non-positive fit. Thus, problems that are produced through a very tolerance-dependent snap-on contour that is produced in a conventional way, for example, in an injection molding method are avoided. In contrast, according to the invention it is provided to print the attachment part with a correspondingly adapted printer, in particular, with a so-called 3D printer, directly on the rolling or sliding bearing.

In the bearing arrangement according to the invention, it is preferred that the attachment part is produced through the layer-by-layer deposition of multiple layers of the meltable or curable material. In this way, a three-dimensional attachment part can be built up layer by layer. After the hardening of a deposited layer, the next layer can be deposited on top.

It is also in the scope of the invention that the attachment part surrounds an object on one or more sides or that the object is integrated in the interior of the attachment part. For this purpose, the melt deposition method is interrupted at a suitable point in time after a holding structure has been printed for the object, the object is inserted, and then the attachment part is completed with the inserted object through the continuation of the printing process, so that the object is preferably surrounded on all sides by the meltable or curable plastic material or it is integrated in the interior of the attachment part.

The object embedded in the attachment part can be, for example, a sensor, a sensor component, an electronic component, or an electronic circuit. In addition, corresponding lines for data transfer and power supply, as well as sensor lines and control lines, etc., can be integrated.

An especially preferred refinement of the invention is given if, in the bearing arrangement according to the invention, the inner ring or the outer ring has an undercut in which the meltable or curable plastic material is inserted. The undercut can be formed, for example, as a groove, in particular, as a sealing groove, so that a positive-fit connection that guarantees the secure holding of the attachment part on the rolling or sliding bearing is created when the molten plastic material is inserted into this groove or undercut.

In the bearing arrangement according to the invention, it is also possible to produce conductor tracks by using a modified meltable or curable plastic material that is electrically conductive. For this purpose, the plastic material can be filled, for example, with graphite. The other areas of the attachment part are produced with a different plastic material that is electrically insulating.

In addition, the invention relates to a method for producing a bearing arrangement, comprising a rolling or sliding bearing with an inner ring and an outer ring and at least one attachment part arranged on the inner ring or on the outer ring. The method according to the invention distinguishes itself in that the attachment part is made from a meltable or curable material that is deposited through a generative production method with a positive fit on the inner ring or the outer ring. Preferably, the material is a plastic material. The generative production method is preferably a melt deposition method.

In the method according to the invention, it is preferred that after the deposition of a part of the meltable or curable plastic material, an object is arranged on top and/or fastened on top and then another part of the meltable or curable plastic material is deposited that at least partially surrounds the object.

To simplify the production of the bearing arrangement, in the method according to the invention it can be provided that the rolling or sliding bearing is fixed in a holder that can pivot and/or rotate about multiple axes and whose position is changed at least once during the deposition of the meltable or curable plastic material. For the melt deposition method, the molten plastic material is typically extruded from a nozzle that is arranged perpendicular, so that the plastic material exits the nozzle vertically downward. By use of the holder, the bearing arrangement and especially the position at which the molten plastic material is to be deposited can be brought into a suitable position. In the scope of this production method, the position of the holder with the rolling or sliding bearing mounted to this holder is changed once or multiple times. Accordingly, in the method according to the invention, preferably at least two layers of the meltable plastic material are deposited with different directions of deposition.

BRIEF DESCRIPTION OF THE DRAWINGS

The invention is explained below using an embodiment with reference to the drawings. The drawings are schematic representations and show.

DETAILED DESCRIPTION OF THE PREFERRED EMBODIMENTS

Figure 1:
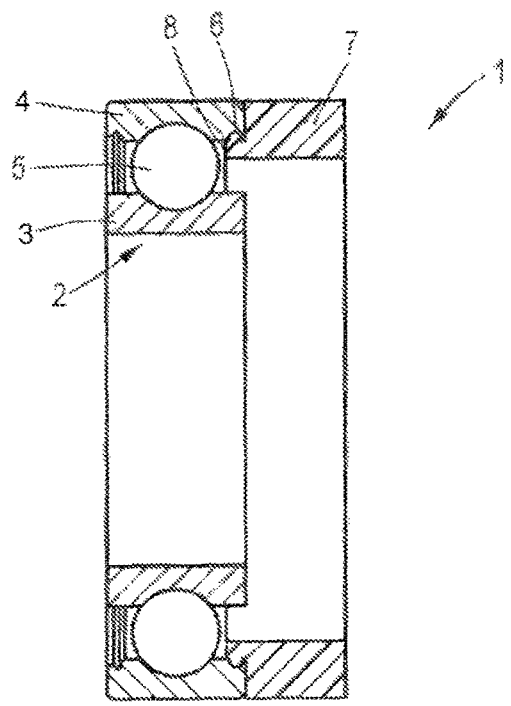
FIG. 1 a sectioned side view of a bearing arrangement according to the invention, FIG. 2 a holder that is used for producing the bearing arrangement according to the invention, FIG. 3 a detail from FIG. 2 in the area of a printing head, FIG. 4 a detail of an attachment part, FIG. 5 a bearing ring during the production of the attachment part, FIG. 6 the bearing ring shown in FIG. 5 in a different position, FIG. 7 a sectioned view of another embodiment of a bearing arrangement according to the invention, FIG. 8 a detail of a bearing ring with mounted attachment part, and FIG. 9 a similar embodiment like that shown in FIG. 8.

FIG. 1 shows a bearing arrangement 1, comprising a rolling bearing 2 with an inner ring 3 and an outer ring 4 between which rolling elements formed as balls 5 are held. In the sectioned view of FIG. 1, it can be seen that the outer ring 4 has a sealing groove 6 in which a mirror-inverted projection 8 of an attachment part 7 is arranged. The attachment part 7 is formed by a generative production method, in the illustrated embodiment by a melt deposition method. Through the production, the attachment part 7 is connected with a positive fit to the outer ring 4.

In the attachment part 7 there is an object that is formed in this case as a sensor. The sensor can be, e.g., a rotational speed sensor in which a pulse encoder ring interacts with a magnet and a Hall IC; the magnet and the Hall IC can be arranged in the attachment part 7 that is connected to the outer ring 4; the pulse encoder ring (not shown) can be connected to the inner ring 3.

Figure 2:
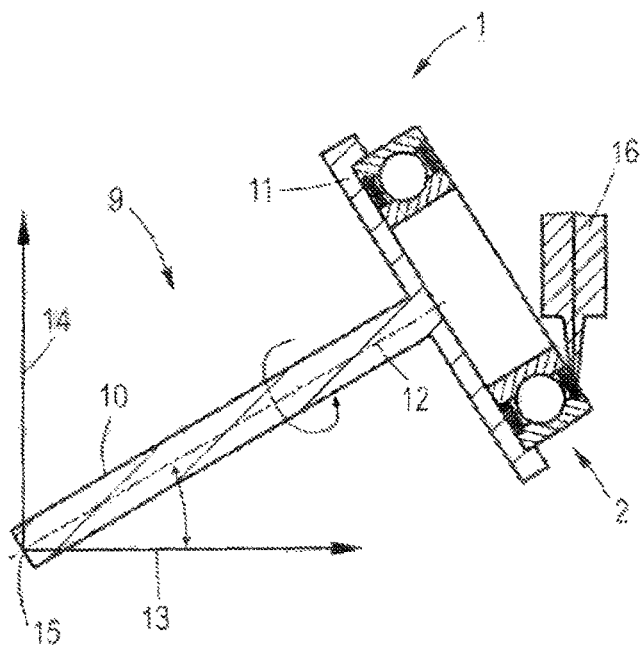

FIG. 2 shows the method for producing the bearing arrangement 1. The rolling bearing 2 is mounted on a holder 9 that has a rotatable journal 10 and a tensioning device 11 that is arranged on the free end of the journal 10 and through which the rolling bearing 2 is held. The holder 9 is rotatable and pivotable about multiple axes, namely about its longitudinal axis, which is represented by the reference symbol 12. It can also be moved along two orthogonal axes 13, 14, wherein the axis 13 is a horizontal axis and the axis 14 is a vertical axis. Finally, the holder 9 can rotate about an axis 15 (z-axis) that is orthogonal to the two axes 13, 14 and extends vertically out of the plane of the drawing in the representation of FIG. 2. The holder 9 is used as a positioning device to position the mounted roller bearing exactly under a print head 16. The print head 16 is a component of a 3D printer with which a melt deposition method can be performed. This method is also called Fused Deposition Modeling (FDM). In the FDM method, a plastic filament is melted and placed layer by layer by an extruder with a fine nozzle (print head 16) in strips in order to form a defined component, in the present case, the attachment part 7. The deposition of the melted plastic material melts the individual extruded strips and a solid plastic part is produced. By positioning the holder 9, i.e., through rotation and one-axis or multiple-axis displacement, the roller bearing 2 held by the holder 9 is positioned exactly under the opening of the stationary print head 16. Because the molten plastic material exists on the bottom side of the stationary print head 16, it is necessary to position and track the material to be printed accordingly.

Figure 3:
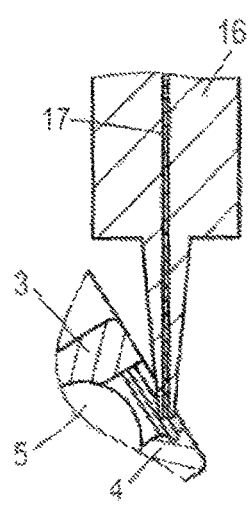

FIG. 3 shows the print head 16 at an enlarged scale. The print head 16 has a hole 17 through which the melted plastic material flows until it emerges at the end of the print head 16. In FIG. 3 it can be seen that the roller bearing 2, more precisely, its outer ring 4, has been positioned under the print head 16 so that the emerging plastic material can be deposited into the sealing groove 6. Through corresponding rotation and optional displacement of the roller bearing 2, the sealing groove 6 can be filled with the meltable plastic material in one processing step. By depositing the plastic material into the sealing groove 6, a positive-fit connection is produced. Then another layer of the plastic material can be deposited onto the plastic material in the sealing groove 6. In this way, the attachment part 7 is gradually built up in multiple layers. In one design, the attachment part 7 can extend around the entire circumference, so that a ring-shaped attachment part is formed. In another design, the attachment part can be generated only over one part of the circumferential direction.

Figure 4:
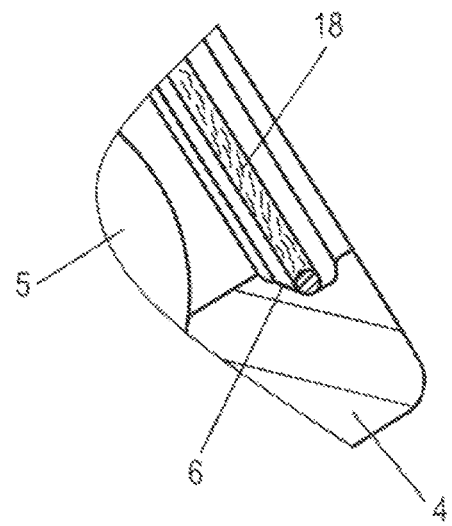

FIG. 4 shows the processing step when the positive-fit connection between the roller bearing 2 and the attachment part to be printed is produced by pressing the meltable plastic material 18 into the sealing groove 6 that has an undercut.

Figure 5:
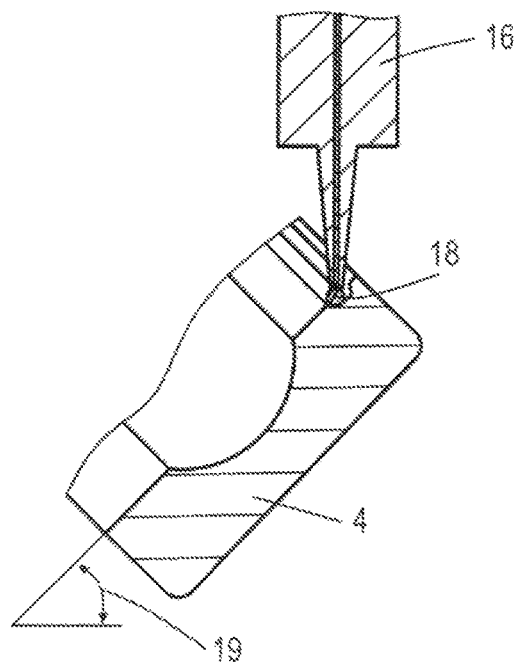
Figure 6:
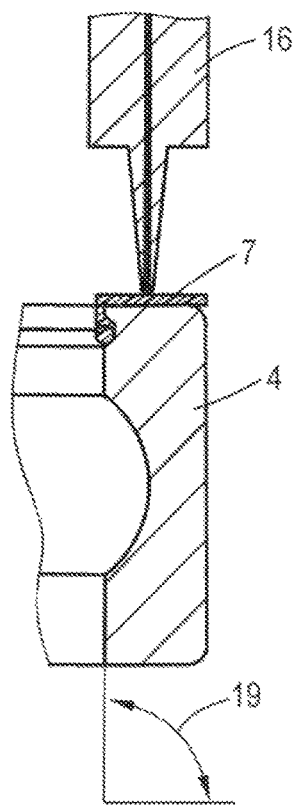

FIG. 5 shows the outer ring 4 of the roller bearing 2 that has been brought into the position shown in FIG. 5 through the holder 9. In this position, the meltable plastic material can be output from the print head 16 into the sealing groove 6. In FIG. 5 it can be seen that the holder 9 has tilted the outer ring 4 by an angle 19. After the sealing groove 6 has been filled, the remaining section of the attachment part is printed, as shown in FIG. 6. To do this, the outer ring 4 is rotated through the holder 9 back into a horizontal position, as is shown in FIG. 6. In this position, the attachment part 7 can be completed. To do this, the melted plastic material is deposited in multiple layers. The holder 9 moves the mounted bearing arrangement 1 horizontally, in order to position the area to be printed under the print head 16.

Figure 7:
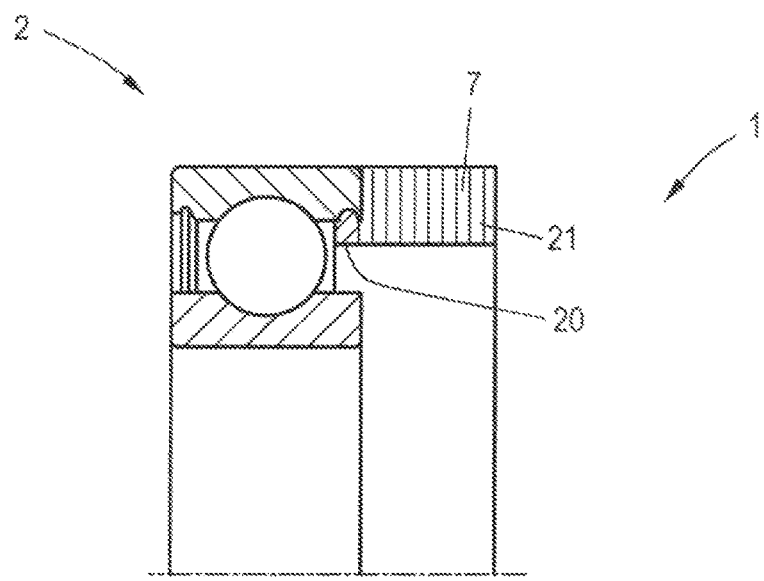

FIG. 7 is a sectioned view and shows the bearing arrangement 1 with the printed attachment part 7 that is arranged with a positive-fit connection in the sealing groove 6 of the outer ring 4. A first shoulder 20 of the attachment part 7 was printed in a first position of the print head 16, which produces a special first layering direction. A second shoulder 21 of the attachment part 7 was printed in a second layering direction, after which the roller bearing 2 was rotated by use of the holder 9 into a second, horizontal position. By depositing the melted plastic material onto a previously produced layer, the individual extruded strips melt with each other and produce the solid attachment part 7 in which at least two layers have different directions of deposition.

Figure 8:
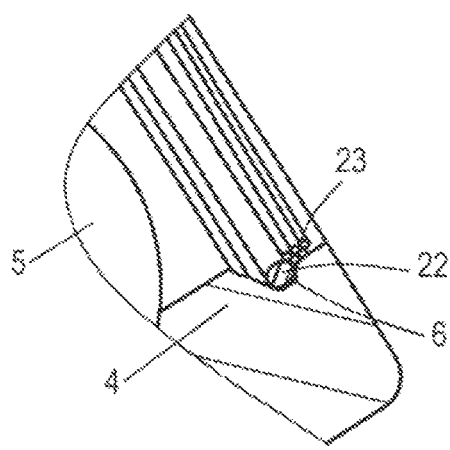

FIG. 8 is a similar representation as FIG. 4 and shows the area of the sealing groove 6 of the outer ring 4 during the production of the attachment part 7. The generated positive-fit connection is generated in this embodiment through over-extrusion, i.e., by printing an especially thick track 22 of the meltable plastic material. In this way, the plastic material is printed into the sealing groove 6, any tolerances are equalized, and a positive-fit connection is automatically produced. If necessary, multiple especially thick tracks can be printed one next to the other and optionally one over the other. Then finer layers 23 of the plastic material are printed over or next to the track 22, which completes the attachment part 7. Tracks or layers with different thicknesses can be printed through corresponding control of the print head 16 which can have, for example, a nozzle with variable diameter. Alternatively, the layer thickness can also be influenced by the advancing speed of the material to be processed. In general, other parameters of the production method can also be varied in order to generate a certain product or certain properties. In addition to the already mentioned adjustment of the nozzle diameter and a changing of the material advance, the feed rate of the print medium, that is, the plastic material, the distance between the workpiece and the print head, or the print head temperature can also be varied or adapted. In practice, some or all of the mentioned parameters are monitored and controlled or regulated.

Figure 9:
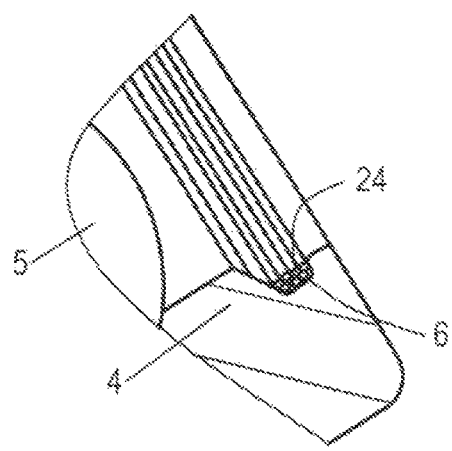

FIG. 9 shows a similar embodiment as FIG. 8 and represents a detail of the bearing arrangement 1 in the area of the sealing groove 6. Instead of one especially thick track of the melted plastic material, in the embodiment of FIG. 9, multiple fine layers 24 are printed axially one next to the other in the sealing groove 6. Then a second layer of multiple strips of the plastic material arranged one next to the other is deposited. In this way, multiple layers are produced, wherein the attachment part 7 is formed.

In one modification of the production method, initially a first part of the attachment part is printed in order to fill the sealing groove. Then the printing process is interrupted and an object such as a sensor or a sensor component is deposited on the plastic material. Then the printing process is continued until the attachment part is completely surrounded by plastic material. For producing a conductive connection, a meltable plastic material can also be used that is electrically conductive. To do this, plastic material is filled with graphite. In this way, an object such as a sensor can be reliably protected from environmental effects and integrated into an attachment part. In addition, electrical connections can be provided.

The described method for producing a bearing arrangement has the advantage that it can also be performed economically at small quantities and guarantees a secure connection of an attachment part to a bearing.

LIST OF REFERENCE NUMBERS

1 Bearing arrangement
2 Roller bearing
3 Inner ring
4 Outer ring
5 Ball
6 Sealing groove
7 Attachment part
8 Projection
9 Holder
10 Journal
11 Tensioning device
12 Reference symbol
13 Axis
14 Axis
15 Axis
16 Print head
17 Hole
18 Plastic material
19 Angle
20 Shoulder
21 Shoulder
22 Track
23 Layer
24 Layer

The invention claimed is:

1. A method for producing a bearing arrangement, comprising a rolling bearing with an inner ring, an outer ring, and at least one attachment part arranged on the inner ring or on the outer ring, the method comprising:
   making the attachment part from a meltable or curable material, layer by layer, through an additive manufacturing process to attach the attachment part to the inner ring or the outer ring with a positive fit.

2. The method according to claim 1, further comprising using an electrically conductive, meltable plastic material for generating a conductor track.

3. The method according to claim 1, further comprising fixing the rolling bearing in a holder that at least one of pivots or rotates about multiple axes and whose position is changed at least once during deposition of the meltable or curable material.

4. The method according to claim 1, wherein different directions of deposition are used to make the layers of the attachment part.

5. The method according to claim 1, further comprising using an electrically conductive, meltable metallic material for generating a conductor track.

6. The method according to claim 1, wherein the additive manufacturing process is a melt deposition process.

7. A method for producing a bearing arrangement, comprising a rolling bearing with an inner ring, an outer ring, and at least one attachment part arranged on the inner ring or on the outer ring,
   the method comprising:
   fixing the rolling bearing in a holder that at least one of pivots or rotates about multiple axes,
   making the attachment part from a meltable or curable material and attaching the attachment part to the inner ring or the outer ring with a positive fit through a generative production, and
   a position of the holder is changed at least once during deposition of the meltable or curable material.

8. The method according to claim 7, further comprising using an electrically conductive, meltable metallic material for generating a conductor track.

9. The method according to claim 7, further comprising using an electrically conductive, meltable plastic material for generating a conductor track.

10. The method according to claim 7, wherein the inner ring or the outer ring has an undercut in which the meltable or curable material is deposited.

11. A method for producing a bearing arrangement, comprising a rolling bearing with an inner ring, an outer ring, and at least one attachment part arranged on the inner ring or on the outer ring, the method comprising making the attachment part from a meltable or curable material and attaching the attachment part to the inner ring or the outer ring with a positive fit through a generative production, wherein the meltable or curable material is deposited in at least two layers with different directions of deposition.

12. The method according to claim 11, further comprising using an electrically conductive, meltable metallic material for generating a conductor track.

13. The method according to claim 11, further comprising using an electrically conductive, meltable plastic material for generating a conductor track.

14. The method according to claim 11, wherein the inner ring or the outer ring has an undercut in which the meltable or curable material is deposited.

* * * * *